United States Patent [19]
Thompson et al.

[11] Patent Number: 5,171,037
[45] Date of Patent: Dec. 15, 1992

[54] FENDER GUARD

[76] Inventors: Clinton K. Thompson, 2707 Academy; Bart A. Baker, 1208 8th Ave., both of Dodge City, Kans. 67801

[21] Appl. No.: 630,003

[22] Filed: Dec. 19, 1990

[51] Int. Cl.⁵ .............................................. B60R 19/00
[52] U.S. Cl. .................................... 280/770; 280/163; 114/344; 108/43; 224/42.31; 293/117; 296/198
[58] Field of Search .................... 280/847, 152.05, 762, 280/848, 770, 154, 414.1, 849, 850, 853, 854, 160, 727, 163, 164.1, 169; 296/181, 75, 198; 293/128, 117; 108/44, 45; 224/42.31, 42.43, 42.03; 114/344

[56] References Cited

U.S. PATENT DOCUMENTS

| | | | |
|---|---|---|---|
| 1,185,458 | 5/1916 | Woodley | 280/164.1 |
| 1,498,482 | 6/1924 | Rutherford | 293/141 |
| 1,532,508 | 4/1925 | MacDonald | 280/847 |
| 2,233,273 | 2/1941 | Vincenzo | 224/42.31 |
| 3,981,521 | 9/1976 | See | 280/760 |
| 4,331,346 | 5/1982 | Walters | 280/414.1 |
| 4,604,013 | 8/1986 | Elwell et al. | 410/106 |
| 4,813,736 | 3/1989 | Schubert et al. | 296/140 |
| 4,909,559 | 3/1990 | Zettle | 280/770 |

Primary Examiner—Andres Kashnikow
Assistant Examiner—Richard M. Camby
Attorney, Agent, or Firm—Fleit, Jacobson, Cohn, Price, Holman & Stern

[57] ABSTRACT

A fender guard associated with and protecting the fenders mounted on a utility type trailer or similar vehicle. The fender guard includes a plurality of generally parallel, laterally spaced rails or frame members that overlie the upper surface of a fender with downwardly and outwardly inclined end portions forming a continuation of the rails or frame members having an attaching bracket at the lower end thereof for mounting on the trailer frame or other rigid component of the trailer. The rails or frame members which overlie the fender are also connected to the fender to provide protection for the fender from heavy objects coming into contact with the fender and also provides a surface on which a person can stand when performing various functions associated with loading and unloading a trailer. The fender guard saves the fenders from damage due to individuals standing on the fenders or hitting the fenders with various loads, equipment and the like.

6 Claims, 1 Drawing Sheet

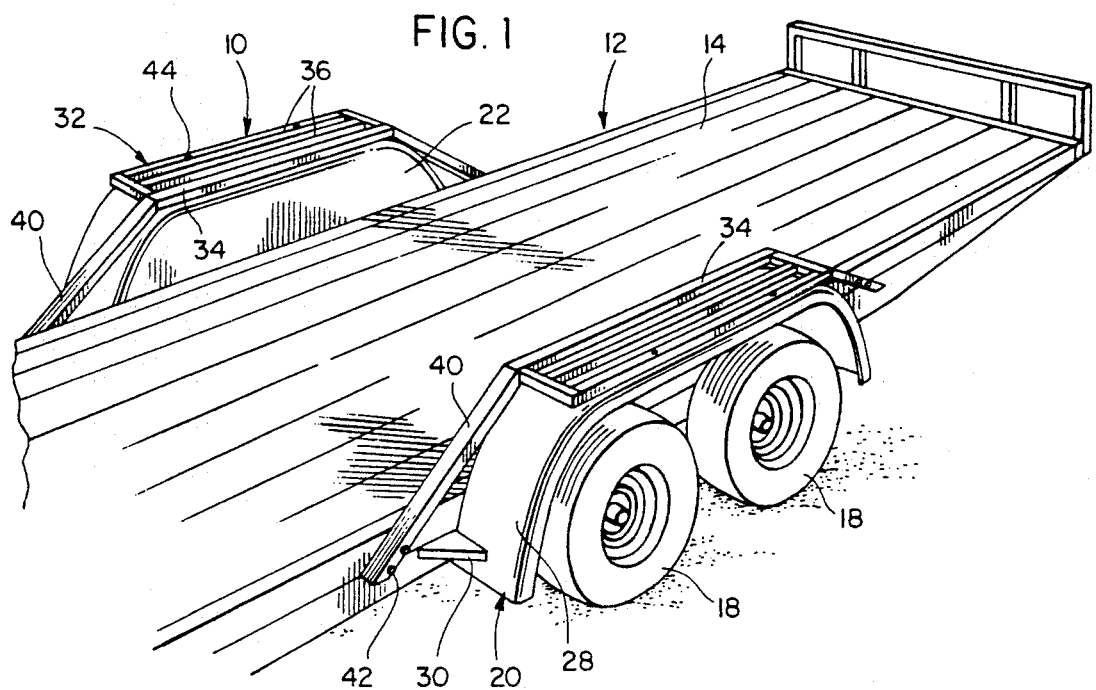
FIG. 1
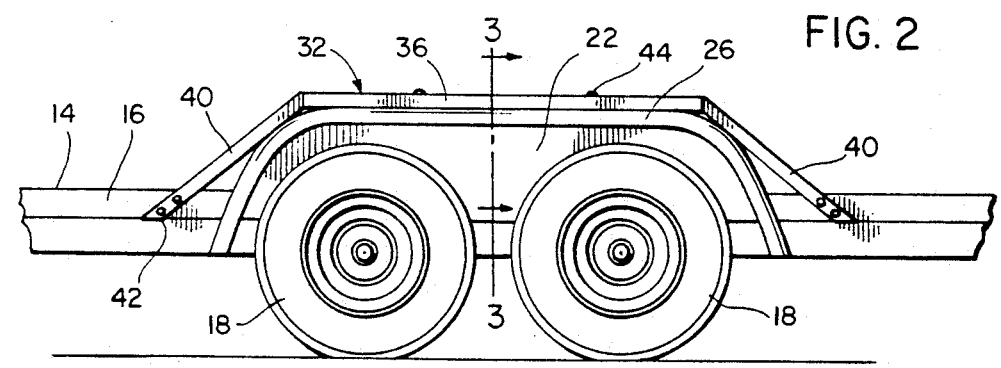
FIG. 2
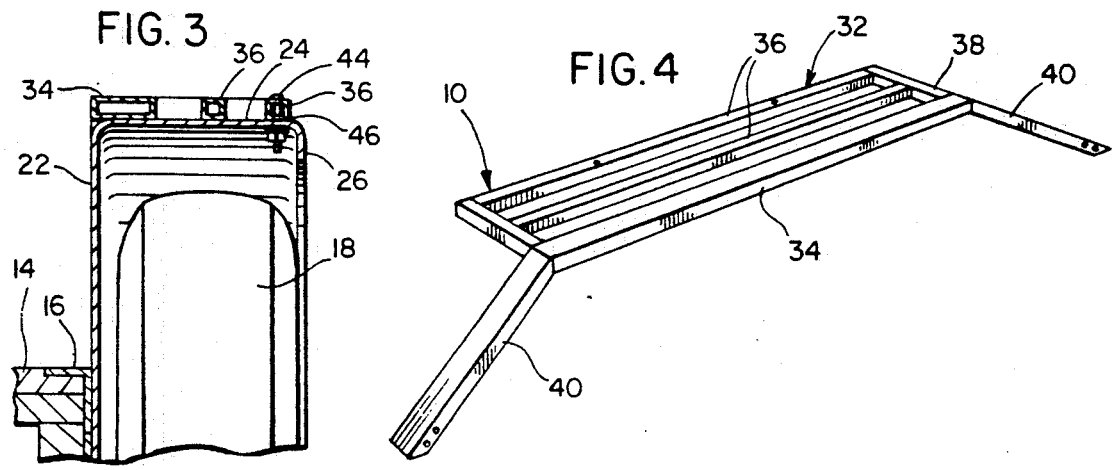
FIG. 3
FIG. 4

FENDER GUARD

BACKGROUND OF THE INVENTION

1. Field of the Invention

The present invention generally relates to a protective device and more specifically a fender guard associated with and protecting the fenders mounted on a utility type trailer or similar vehicle. The fender guard includes a plurality of generally parallel, laterally spaced rails or frame members that overlie the upper surface of a fender with downwardly and outwardly inclined end portions forming a continuation of the rails or frame members having an attaching bracket at the lower end thereof for mounting on the trailer frame or other rigid component of the trailer. The rails or frame members which overlie the fender are also connected to the fender to provide protection for the fender from heavy objects coming into contact with the fender and also provides a surface on which a person can stand when performing various functions associated with loading and unloading a trailer. The fender guard saves the fenders from damage due to individuals standing on the fenders or hitting the fenders with various loads, equipment and the like.

2. Description of the Prior Art

In handling and transporting various materials, equipment and other loads, a trailer frequently is articulately connected to a towing vehicle. While trailers have been constructed in many shapes and configurations, one well known type of trailer is known as a utility trailer and includes a generally rigid, rectangular deck or platform for carrying a load with the upper surface of the deck being generally planar which enables various types of loads to be transported. Such trailers are usually supported by a pair of side wheels or tandem wheels on each side depending upon the load capacity of the trailer. Fenders are provided in overlying relation to the upper portion of the supporting wheels with the fenders usually being attached to the frame of the trailer deck and projecting above the trailer deck along each side thereof to cooperate with the wheels in a conventional manner. Thus, the fenders project upwardly along each side of the load receiving deck of the trailer and are subject to damage when engaged by equipment or other loads carried by the trailer. Also, when an automobile or other type vehicle is carried by the trailer, the fenders are frequently used as a step to enable better access to the interior of the automobile being conveyed by the trailer. Damage to fenders from various causes seems to be more prevalent on rental trailers and proprietors of trailer rental businesses face considerable expense in replacing and repairing damaged fenders on rental trailers of various types.

There have been attempts made to provide protective devices for various components of vehicles to prevent damage from coming into contact with external obstructions and damage from individuals engaged in loading and unloading the vehicle. The following U.S. Pat. No. disclose protective devices for various vehicular components and areas.

1,185,458
1,498,482
1,532,508
3,981,521
4,604,013
4,909,559

The above patents do not disclose a structure for protecting fenders on a trailer as disclosed in this invention.

SUMMARY OF INVENTION

An object of the present invention is to provide a guard for each of the fenders on a vehicle of the type having fenders with exposed, upwardly facing surfaces subject to damage by contact with equipment, loads and by individuals standing on the fenders and using them as steps.

Another object of the invention is to provide a fender guard including an elongated generally rectangular frame structure defined by spaced parallel rails or frame members positioned in overlying relation to the upwardly exposed surface of a vehicle's fender and including downwardly inclined forward and rearward portions having brackets on the ends thereof for rigid mounted engagement with the frame or other rigid component of the vehicle thereby protecting the fender against damage from contact with loads, equipment and providing a step for individuals to stand on rather than on the fender.

A further object of the invention is to provide a fender guard in accordance with the preceding objects in which the central portion of the fender guard is generally horizontally disposed and secured to the fender to stabilize the fender and fender guard with the guard including an inner rail or frame member which is larger and stronger than the outer rails or frame members which are supported in a cantilever fashion from the larger and stronger rail or frame member.

Still another object of the invention is to provide a fender guard for each of the fenders on a utility type trailer in which the fenders are positioned alongside and project above a load carrying surface of the trailer and are subject to damage from various loads and equipment coming into contact with the fenders and by individuals standing on the fenders and using them as a step with each fender guard including a substantially rigid frame structure overlying the fender and rigidly affixed to the trailer with each guard including a generally rectangular upwardly facing surface forming a step for individuals engaged in various activities relating to loading or unloading the trailer and to protect the fenders from being damaged by loads or equipment coming into contact with the fenders.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is perspective view of a utility trailer illustrating the fender saver of the present invention associated with each of the fenders.

FIG. 2 is a side elevational view of the fender guard illustrating its association with the fenders, trailer and supporting wheels.

FIG. 3 is a transverse, sectional view taken substantially upon a plane passing along section line 3—3 on FIG. 2 illustrating further structural details of the fender guard and its association with the fender and supporting wheels.

FIG. 4 is a perspective view of the fender guard.

DESCRIPTION OF THE PREFERRED EMBODIMENT

Referring now specifically to the drawings, the fender guard of the present invention is generally designated by reference numeral 10 and, in FIGS. 1-3, the fender guard 10 is illustrated in association with a utility trailer 12 having a generally planar, rectangular load supporting deck or platform 14 provided with a peripheral frame structure 16 and tandemly arranged supporting wheels 18 along each side thereof which are connected with the frame 16 in a conventional and well known manner. A fender generally designated by numeral 20 is mounted on the frame 16 of the trailer 12 in a conventional manner with the fender being of conventional construction and including an inner wall 22 disposed vertically from the side edge of the frame 16 of the trailer deck 14 and inwardly of the wheels 18. The fender 20 includes a top wall 24 which extends laterally above the wheel 18 and terminates in a downturned outer flange 26. The forward and rearward edge of the fender 20 is downwardly curved at 28 with suitable bracket structures 30 and fastening devices used to secure the fender in place in properly spaced relation to the wheels 18 in order for the fenders to comply with various regulations and to function in a conventional manner. When loads are being placed on the deck 14 of the trailer 12, the fenders 20, which project above and alongside the deck 14, are subject to damage by the load, equipment or the like being placed on the deck coming into contact with the fenders. Also, there is a tendency for individuals who are loading or unloading the trailer to use the fenders as a supporting step. This is especially prevalent when the load on the trailer 12 is an automobile or similar vehicle in which event the fenders 20 form a convenient step when the loaded vehicle operator is entering or leaving the automobile or other vehicle positioned on the trailer deck.

The fender guard 10 of this invention protects the fender 20 from damage from loads and individuals using the fenders as a step by providing a rigid structure which overlies and protects the fender and in itself provides a generally horizontally disposed, rectangular surface to form a safe and secure step or supporting surface for individuals engaged in various loading and unloading activities.

The fender guard includes a generally rectangular frame 32 which is horizontally disposed and has a length and width substantially equal to the length and width of the horizontally disposed top wall 24 of the fender 20 and is disposed in overlying aligned relation thereto as illustrated in FIGS. 1-3. The rectangular frame includes an inner frame rail 34 and two or more outer frame rails 36 which are in laterally spaced relation to each other and to the inner frame rail 34 with all of the frame rails being rigidly interconnected by end frame rails 38 thereby forming a rigid, rectangular structure formed by a plurality of longitudinally extending, parallel and laterally spaced frame rails 34, 36. As illustrated, all of the frame rails have upper and lower surfaces oriented in the same horizontal plane but the inner frame rail 34 is of larger cross-sectional configuration as illustrated in FIG. 3 thus forming a rigid inner frame rail with the frame rails 36 being supported therefrom in cantilever fashion by the end frame rails 38. Also, as illustrated, each of the frame rails is of hollow tubular construction to provide a rigid but yet relatively lightweight frame 32. The inner frame rail 34 includes a downwardly and longitudinally outwardly inclined frame rail 40 which forms a continuation of the frame rail 34 and is rigidly affixed thereto with the downwardly and longitudinally extending frame rail 40 overlying the downwardly curved forward and rearward ends 28 of the fender 20 and terminating as a bracket alongside the frame 16 of the trailer deck 14 and being secured thereto by a pair of bolts 42 in order to rigidly secure the fender guard 10 to the frame 16 of the trailer deck 14. Also, the outermost frame rail 36 which overlies the outermost edge of the top wall 24 of the fender 22 is secured to the fender by a pair of bolts 44 with rubber grommets 46 being positioned between the outermost frame rail 36 and the top wall 24 of the fender 22.

While dimensional characteristics may vary, the frame 32 may have an overall length of 48" and the frame rails 36 and end rails 38 may be a 1" square tubing with a 150" wall. The inner frame rail 34 may be a 1"×2" tubular member with a 150" wall. The bolts 42 may be a carriage bolt with lock washer and nut with two carriage bolts being provided at each end of the fender guard and the bolts 44 may be 2" carriage bolts with rubber grommets, lock washers and nuts. The angle of the downwardly inclined frame rails 40 may be approximately 50° from horizontal and the length of the downwardly inclined frame rails 40 may be 30" to 36". The overall width of the frame 32 may be 8½" with the rails 34 and 36 being equally spaced. As pointed out, the dimensions may vary depending upon whether the fender is associated with tandem wheels or a single wheel on each side and will also vary depending upon the size of the wheels and the relationship of the wheels, fender and trailer components. Also, as indicated, rental companies rent trailers to customers for various purposes including the purpose of transporting an automobile behind a towing vehicle. When the automobile to be transported or the load is loaded onto and unloaded from the trailer, the individuals involved frequently stand on the fenders and in some instances drive vehicles over the fenders or hit them with the equipment thus resulting in considerable damage to fenders requiring replacement or repair when the rental trailer is returned before it can be rented to another customer. The fender guard of the present invention eliminates this type of damage to the trailers and by being attractively painted in a manner compatible with the fenders and the remainder of the trailer, the trailer will present a neat and attractive appearance which will frequently cause a rental customer to take better care of the rental equipment thus resulting in more satisfied customers and less expense resulting from damage to fenders on rental trailers.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A guard for a fender associated with a vehicle wheel in which the fender includes an upwardly facing surface subject to damage when contacted by a load, equipment or a person standing on the fender, said guard comprising a generally horizontally disposed frame defining an upwardly facing flat surface adapted to be disposed in overlying relation to the upwardly facing surface of the fender, and means on said frame adapted to support the frame rigidly from a vehicle in position to protect the fender from damage, said means on said frame including a forwardly and downwardly inclined frame rail at one end of the frame and a rearwardly and downwardly inclined frame rail at the other end of the frame, said frame rails being rigid with respect to said frame, each of said frame rails including means at the end thereof remote from the frame adapted to receive bolts for mounting the guard from a vehicle, said frame including a plurality of longitudinally extending parallel, laterally spaced frame rails with the ends of the spaced frame rails being interconnected by end frame rails to form a rigid, rectangular frame having an upwardly facing, generally planar surface defined by the upper surfaces of the spaced frame rails.

2. The guard as defined in claim 1 wherein the inclined frame rails are rigidly connected to and form continuations of the frame rail forming an inner edge of said frame with the inclined frame rails and the frame rail of the frame connected therewith being of larger cross-sectional configuration than the other frame rails forming the frame, said downwardly inclined frame rails adapted to be secured to a frame component of a utility trailer by said means at the ends thereof with the frame positioned in overlying relation to a utility trailer fender and means adapted to interconnect the frame and the outer edge portion of a utility trailer fender.

3. In combination with a vehicle having side supporting wheels and a fender rigid with the vehicle and overlying each of the side supporting wheels, a fender guard including a generally rectangular frame overlying each fender, said fender guard including forwardly and rearwardly extending mounting means rigidly affixing the fender guard to the vehicle for mounting the frame in overlying relation to the fender to protect the fender from damage, said mounting means including a downwardly and longitudinally outwardly inclined frame rail at each end of the frame and forming an extension of an inner side edge of said frame, said frame including a plurality of laterally spaced, parallel frame rails rigidly interconnected and cantilever supported from an inner frame rail with the inclined frame rails forming continuations of the inner frame rail to rigidly support the frame in overlying relation to the fender and means securing an outer edge portion of the frame to an outer portion of the fender.

4. The combination as defined in claim 3 wherein said vehicle is a utility type trailer with a load deck having a fender projecting upwardly from each side thereof, said mounting means including bolts securing the inclined frame rails to said trailer, and said securing means including bolts securing the outer edge portion of the frame to the outer portion of the fender.

5. In combination, a utility trailer having a frame structure, a supporting wheel mounted at each side of said trailer frame structure and supporting the trailer for over-the-road movement, a fender mounted at each side of the trailer frame structure and position in overlying relation to the supporting wheel, and a fender guard in overlying protective relation to each of said fenders, each fender guard comprising a rigid frame extending longitudinally of the trailer above said trailer frame structure and having an upwardly facing supporting surface above the fender and means at each end of said frame mounting said frame rigidly from the frame structure of the trailer in overlying protective relation to the fender, said means at each end of the frame mounting said frame rigidly from the structure of the trailer including a frame rail extending rigidly from a forward and rearward end of said frame and means securing the ends of the frame rails remote from the frame rigidly to said frame structure of the utility trailer thereby protecting the fenders.

6. The combination as defined in claim 5 wherein said frame includes an inner frame rail and a plurality of outer frame rails oriented in laterally spaced, generally parallel relation to each other, said inner and outer frame rails being rigidly interconnected by a pair of end rails perpendicular to the inner and outer frame rails, said inner frame rail having a cross-sectional configuration larger than the cross-sectional configuration of the outer frame rails, said frame rails extending from the ends of said frame being aligned with and forming continuations of the inner frame rail with the extending frame rails being downwardly inclined and inclined longitudinally of the trailer, means at the ends of the inclined frame rails remote from the end rails of the frame securing the inclined frame rails rigidly to the frame structure of the trailer and means connecting the outermost of the outer frame rails to an outer edge portion of said fender thereby providing a rigid fender guard mounted in overlying relation to each fender on the utility trailer.

* * * * *